(12) United States Patent
Komarla et al.

(10) Patent No.: US 7,409,575 B2
(45) Date of Patent: Aug. 5, 2008

(54) RECOVERY OF COMPUTER SYSTEMS

(75) Inventors: Eshwari P. Komarla, Bangalore (IN); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 643 days.

(21) Appl. No.: 11/026,792

(22) Filed: Dec. 31, 2004

(65) Prior Publication Data
US 2006/0145133 A1 Jul. 6, 2006

(51) Int. Cl.
*G06F 11/00* (2006.01)
(52) U.S. Cl. ........................................... 714/2
(58) Field of Classification Search ............ 714/2, 714/4, 7, 9, 15, 18, 43, 13, 20
See application file for complete search history.

(56) References Cited

U.S. PATENT DOCUMENTS

| | | | |
|---|---|---|---|
| 5,835,566 A * | 11/1998 | Cowgill | 379/15.01 |
| 6,732,195 B1 * | 5/2004 | Baldwin | 710/6 |
| 6,973,587 B1 * | 12/2005 | Maity et al. | 714/6 |
| 7,006,479 B1 * | 2/2006 | Joo et al. | 370/338 |
| 7,139,932 B2 * | 11/2006 | Watanabe | 714/6 |
| 2005/0198453 A1 * | 9/2005 | Osaki | 711/162 |
| 2006/0073820 A1 * | 4/2006 | Craswell et al. | 455/419 |

OTHER PUBLICATIONS

Yung-Chin Fang et al., "High-Performance Clusters: Out-of-Band Management Approaches", www.dell.com/powersolutions, High-Performance Computing, Issue 4, 2001, pp. 23-28.
"Intel Active Management Technology", Dec. 7, 2004, 3 pages, http://www.intel.com/technology/manage/iamt/.

* cited by examiner

*Primary Examiner*—Nadeem Iqbal
(74) *Attorney, Agent, or Firm*—Schwabe, Williamson & Wyatt, P.C.

(57) ABSTRACT

Techniques for enabling remote recovery of computer system is disclosed. OOB communication with a provisioning server is established using a wireless communication device on a computer system that fails. The computer system includes an OOB controller. The OOB communication is authenticated. A disk image is downloaded from a server. Operations to correct the failure are performed.

19 Claims, 5 Drawing Sheets

RECOVERY OF COMPUTER SYSTEMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The field of invention relates generally to computer systems and, more specifically relates to recovery of computer systems remotely.

BACKGROUND

A common component in most computer systems, such as a personal computer (PC), laptop computer, workstation, etc., is a disk drive, also referred to as a hard disk, a hard drive, fixed disk, or magnetic disk drive. Despite the mean-time between failure (MTBF) claimed by manufacturers of disk drives, the shock and vibration may severely taxes the MTBF, especially when the computer system is a laptop or a notebook system. The disk drive typically serves as permanent data storage for an Operating system (OS) and other applications. Critical data may also be stored in the disk drive. When exposed to shock and vibration, the disk drive may develop bad sectors. When the bad sectors are in an area where the OS resides, the OS may not be read successfully from the disk drive, causing the computer system to fail. When there is a disk drive problem, it may be necessary to rebuild the computer system. Depending on how the rebuilding process is performed, the computer system may not be available for an extended period of time. There are on-going efforts to improve the rebuilding process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

For one embodiment, a method and a system for enabling recovery of a computer system remotely are disclosed. When the computer system fails, the recovery of the computer system may be performed using out of band (OOB) communication. Recovery data may be sent to the computer system from a server computer using a wireless communication device.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Computer System

Figure 1:
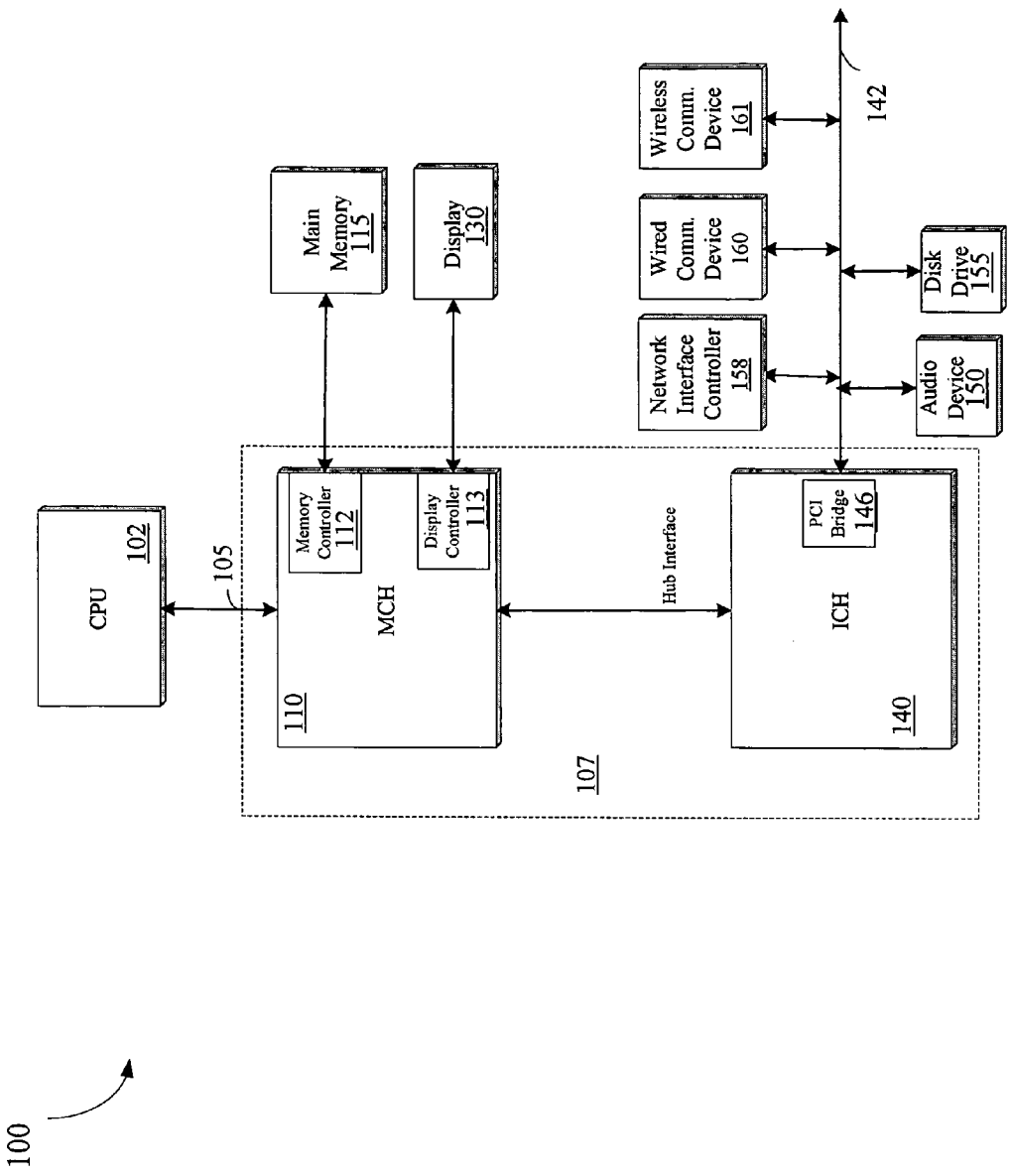
FIG. 1 illustrates an example of a computer system, in accordance with one embodiment.

FIG. 1 illustrates an example of a computer system, in accordance with one embodiment. Computer system 100 may include a central processing unit (CPU) or processor 102 and may receive its power from an electrical outlet or a battery. The CPU 102 may be coupled to a bus 105. The CPU 102 may be manufactured by, for example, Intel Corporation of Santa Clara, Calif., although it may also be manufactured by other companies.

Chipset 107 may be coupled to the bus 105. The chipset 107 may include a memory control hub (MCH) 110. The MCH 110 may include a memory controller 112 that is coupled to system memory 115 (e.g., random access memory (RAM), read-only memory (ROM), etc.). The system memory 115 may store data and sequences of instructions that are executed by the CPU 102 or any other processing devices included in the computer system 100. For example, the system memory 115 may include an image of an operating system (OS) such as Windows XP from the Microsoft Corporation of Redmond, Wash. The MCH 110 may include a display controller 113. A display 130 may be coupled to the display controller 113. The display 130 may be a liquid crystal display (LCD), an organic light emitting diode (OLED) display, or a display implemented using any other display technologies.

The chipset 107 may also include an input/output control hub (ICH) 140. The ICH 140 is coupled with the MCH 110 via a hub interface. The ICH 140 provides an interface to input/output (I/O) devices within the computer system 100. The ICH 140 may be coupled to a peripheral bus (e.g., Peripheral Component Interconnect (PCI) bus) 142. The ICH 140 may include a PCI bridge 146 that provides an interface to the PCI bus 142. The PCI bridge 146 may provide a data path between the CPU 102 and peripheral devices. The ICH 140 may be connected to a network interface controller (NIC) 158 via the PCI bus 142. A wired communication device 160 and a wireless communication device 161 may be connected to the PCI bus 142. The wireless communication device 161 may be coupled to an antenna (not shown) and may be in any form factor including, for example, in the form of a Personal Computer Memory/Card International Association (PCMCIA) card or in the form of a silicon chip installed on the mother board. For example, computer systems that feature Intel Centrino Mobile Technology (CMT) may include a wireless chip along with a processor chip and a chipset family. Although not shown, the PCI bus 142 may also be connected to various I/O devices via corresponding interfaces and/or ports. These may include, for example, keyboard, mouse, etc. The computer system 100 may be referred to as a client computer system when it is connected to a network and communicating with a server computer system (not shown).

Security Association with a Server Computer System

Figure 2A:
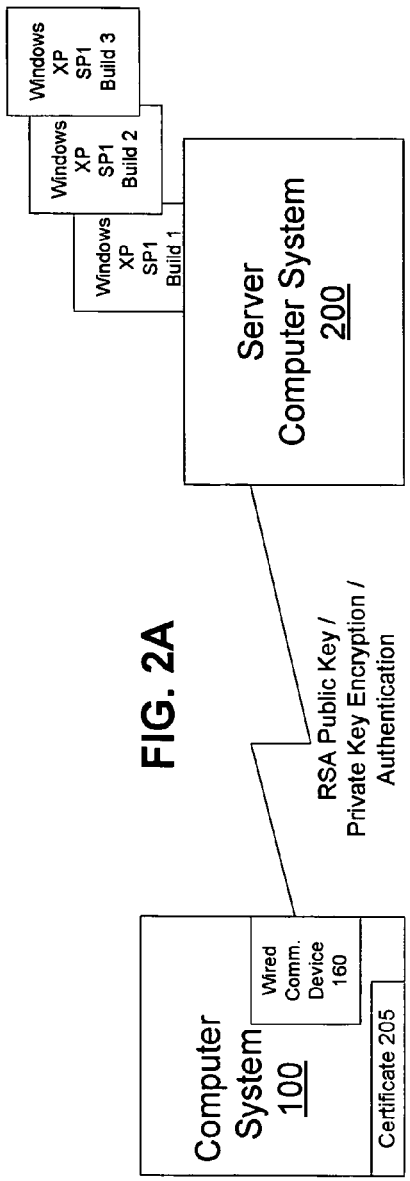
FIG. 2 is a block diagram illustrating one example of an OOB controller, in accordance with one embodiment.

FIG. 2A is a block diagram illustrating information exchanged between a computer system and a server computer system, in accordance with one embodiment. Typically, when the computer system 100 is to be distributed to a user in a corporate environment, some forms of asset management procedure are performed by an information technology (IT) department. For example, the IT department may provision the computer system 100 with a key pair (public key and private key) as used in RSA crypto system for encryption and authentication. RSA crypto system is known to one skilled in the art. The private key may be hidden in the computer system 100, and the public key may be distributed to other computer systems.

Using its private key, the computer system 100 may include a digital signature in the information sent to the server computer system 200, which may confirm that the information is sent by the computer system 100 by using a public key of the computer system 100. Similarly, the server computer system 200 may include a key pair of public key and private key. This may enable the computer system 100 to challenge and verify the server computer system 200. The server computer system 200 may also include its digital signature in the information downloaded to the computer system 100. This may help prevent an unauthorized computer system pretending to act as the server computer system 200. For example, using the public key of the server computer system 200, the computer system 100 may send encrypted information to the server computer system 200, which may then decrypt the information using its private key.

Figure 2B:
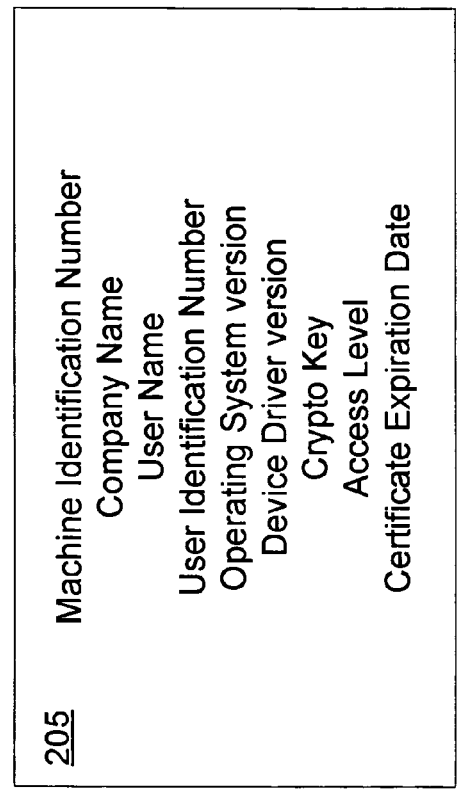

FIG. 2B is a diagram illustrating an example of a certificate, in accordance with one embodiment. Certificate 205 may be shipped with the computer system 100. For example, the certificate 205 may include credential information indicating identity of the computer system 100, name of the corporation that owns the computer system 100, name of a user the computer system 100 is assigned to, identification of the user, information about a current build of an installed OS, information about installed device drivers, crypto keys, expiration date of the certificate 205, etc. The information in the certificate 205 may be used by the server computer system 200 to verify that the computer system 100 is an authorized computer system.

The certificate 205 may also include information about level of access that the computer system 100 may have on the server computer system 200. For example, when connected with the server computer system 200, the computer system 100 may only access on the server computer system 200 information relating to corporate information, device driver, a particular OS image, etc. The server computer system 200 may query asset information in the computer system 100 remotely. In response, the computer system 100 may respond to the query using the information in the certificate 205.

Computer System Failure

The communication described above may be performed using the wired communication device 160. However, when the computer system 100 fails, the wired communication device 160 may not be available. There may be many factors that can cause the computer system 100 to fail. These factors include, for example, errors or failure associated with the disk drive 155. The errors may prevent information stored on the disk drive 155 to be retrieved. The information may include, for example, a copy of the OS. When the OS cannot be retrieved from the disk drive 155, the computer system 100 may not be successfully started. Typically, when the computer system 100 fails due to failed disk drive, the recovery operation may necessitate a re-installation of the OS and applications as well as restoring of user and application data. A computer technician may be dispatched to perform on-site diagnostics and recovery. Some recovery techniques may require an operator issuing commands from a console to initiate the recovery process. For example, Intel Active Management Technology from the Intel Corporation includes a management console and a console operator managing the recovery process. In general, the recovery process may take time and the computer system 100 may be out of operation for a long time.

OOB Controller

Figure 3:
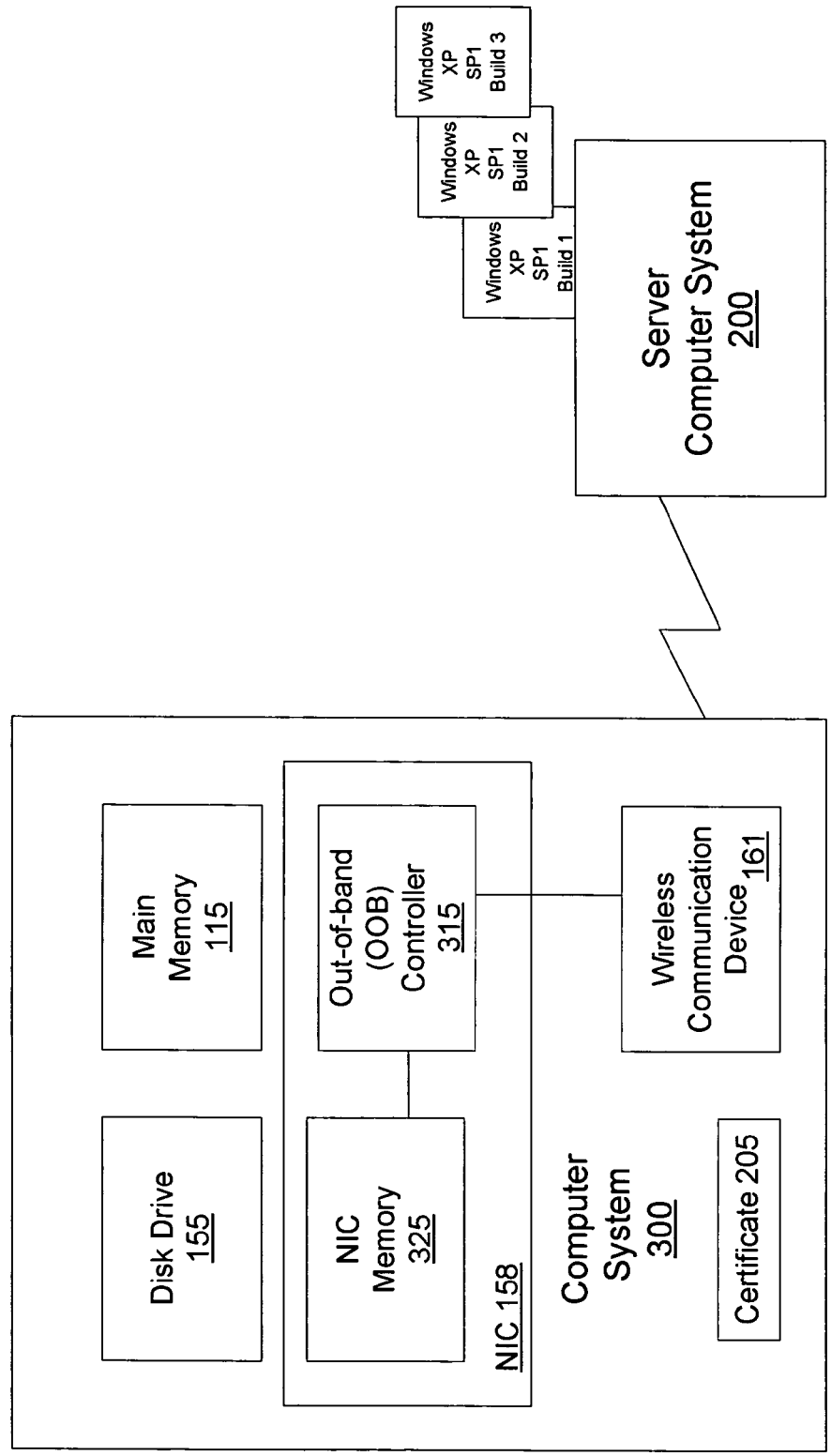
FIG. 3 is a block diagram illustrating an example of OOB communication between a computer system and a server system, in accordance with one embodiment.

FIG. 3 is a block diagram illustrating one example of an OOB controller, in accordance with one embodiment. Computer system 300 may include an OOB controller 315. The OOB controller 315 may be coupled to a power source (not shown) enabling it to remain active even when the computer system 300 fails. This power source may be the same power source as used by the computer system 300. Alternatively, this may be a separate power source. The power source used by the OOB controller 315 may be a direct current (DC) power source. For one embodiment, the OOB controller 315 may be part of a media access control (MAC) of the NIC 158 which is coupled to the chipset 107 via the PCI bus 142. For another embodiment, the OOB controller 315 may be part of the chipset 107. The OOB controller 315 may use an OOB networking stack with one or more layers (not shown) for communication.

For one embodiment, the OOB controller 315 may need to be registered with the server computer system 200. The registration may be performed by the IT department, or it may be performed automatically when a connection is established between the computer system 300 and the server computer system 200. The registration may include, for example, sending identification information of the OOB controller 315 to the server computer system 200.

Recovery Using an OOB Controller

For one embodiment, when the computer system 300 fails, one or more alerts may be generated and sent to the OOB controller 315. The OOB controller 315 may cause a recovery agent to execute. The recovery agent may be stored in a firmware (not shown) in the computer system 300. The recovery agent may include a set of instructions that may be loaded into the main memory 115. The recovery agent may determine the errors that cause the computer system 300 to fail. For example, the recovery agent may scan the disk drive 155 to identify any potential bad disk sectors. The recovery agent may cause the bad disk sectors to be skipped.

The OOB controller 315 may further execute instructions to establish a connection with the server computer system 200 using the wireless communication device 161. For one embodiment, the OOB controller 315 may access the information (e.g., machine identification number) in the certificate 205 to authenticate the computer system 300 with the server computer system 200. The authentication may be based on any challenge-response protocol such as, for example, Extensible Authentication Protocol Transport Level Security (EAP-TLS) or the emergent standard from Cisco EAP Flexible Authentication via Secure Tunneling (EAP-FAST). For example, the EAP makes the initial security association at layer 2 (TLS handshake protocol). The TLS protocol provides for confidentiality by encrypting ensuing transactions (e.g., downloading of information). Using the EAP may be better than using Dynamic Host Configuration Protocol (DHCP) because DHCP may have the possibility of hijacking DHCP servers, etc., and other known vulnerabilities. The security association generated via the EAP transaction may be used to generate shared symmetric key (e.g., master secret in TLS). The EAP may also be used to ensure that an authorized server (e.g., server computer system 200) is sending a disk image and that an authorized client (e.g., computer system 300) is receiving the disk image.

The OOB controller 315 may download from the server computer system 200 a disk image corresponding to an image of information stored on the disk drive 155. The disk image may be signed with digital signature by the server computer system 200 to confirm its integrity. The disk image may be in compressed form. After the disk image is downloaded and uncompressed, the recovery agent may rewrite the disk drive 155 using the downloaded disk image. The OOB controller 315 may then recover the computer system 300 by resetting the computer system 300 causing the information on the re-written disk drive 155 to be used. It may be noted that resetting the computer system 300 may include resetting the processor 102. For one embodiment, the recovery agent mentioned above may be downloaded from the server computer system 200.

For one embodiment, the OOB controller 315 may download from the server computer system 200 information that can be used to establish a small or limited execution environment. The limited execution environment may not occupy as much space in the main memory 115 as a normal execution environment. The limited execution environment may enable a limited but essential set of operations to be performed. For example, the limited execution environment may include one or more applications (e.g., communication software, calendar software, etc.) that can be fully memory resident without having to access the disk drive 155. The OOB controller 315 may then cause the computer system 300 to reset enabling the computer system 300 to come up in the limited execution environment. Repair operations such as, for example, scanning the disk drive 155 for bad sectors, etc. may be performed in the limited execution environment. Thus the computer system 300 may be recovered back to operation remotely in the field without involvement of an operator.

The server computer system 200 may host many builds and service-patched OS images for different computer systems. The server computer system 200 may also be referred to as a provisioning server. For one embodiment, the OOB controller 315 may download from the server computer system 200 an OS image that corresponds to a particular build consistent with the information in the certificate 205. For one embodiment, the downloaded information (e.g., OS image) may be encrypted using the public key of the computer system 100. The encrypted information may also be compressed in order to save on wireless bandwidth. For another embodiment, the downloaded information may include a digital signature of the server computer system 200 (signed using the private key of the server computer system 200) to enable the computer system 300 to verify the integrity of the downloaded information.

It may be noted that some information in the certificate 205 may be modified while other information may not be modified. For example, the machine identification number may not be modified, while the build of the OS may be modified as newer build of the OS is installed. For one embodiment, the OOB controller 315 may enable upgrades or migrations to be performed on the computer system 300 using information available in the server computer system 200. For example, the OOB controller 315 may recognize that the computer system 300 has been upgraded to a newer build of the OS and may modify the certificate 205 to reflect such upgrade. For another example, the OOB controller 315 may recognize that the computer system 300 is authorized to access a newer build of the OS stored in the server computer system 200. The OOB controller 315 may then download the newer build and reset the computer system 300.

Figure 4:
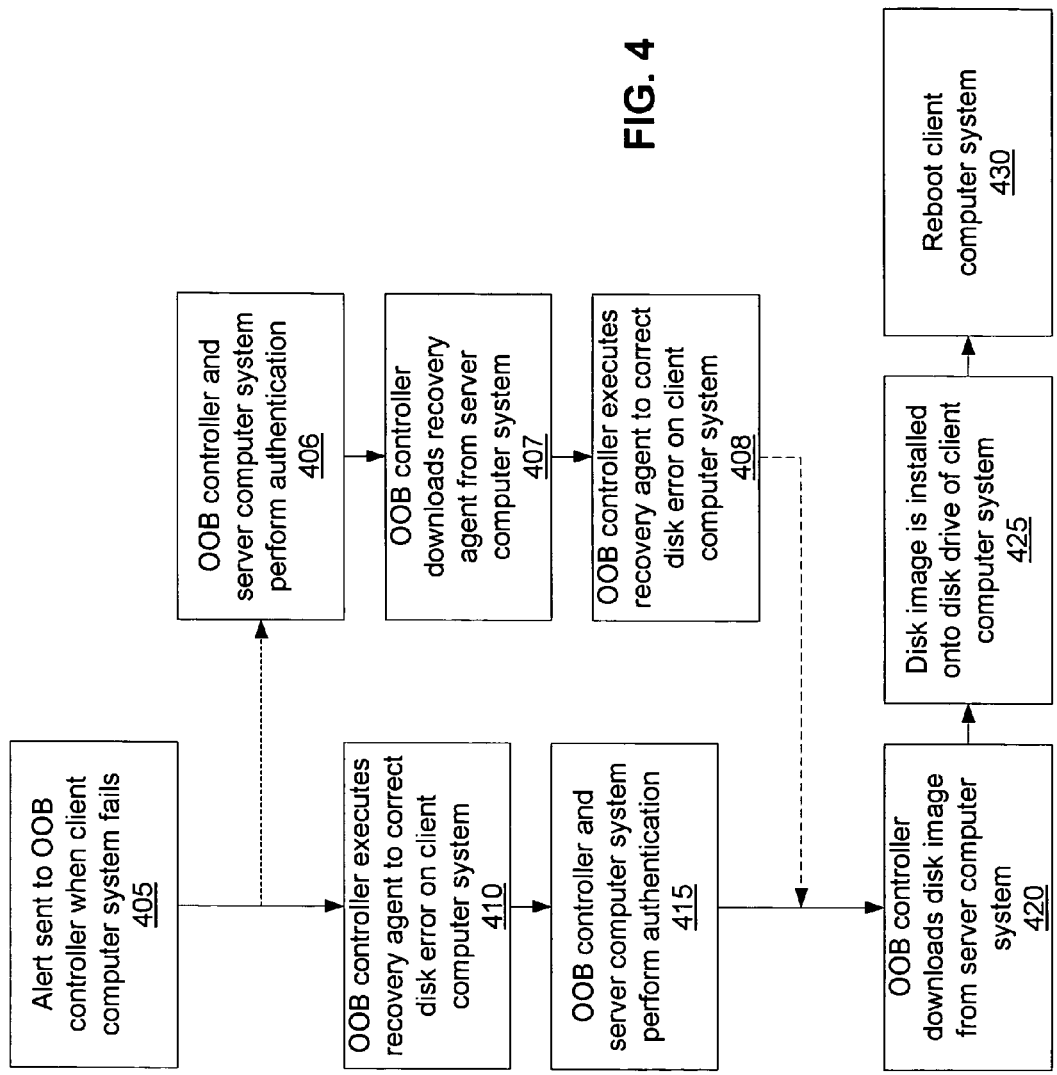
FIG. 4 is a flow diagram illustrating an example of a process for recovering a computer system by downloading a disk image, in accordance with one embodiment.

FIG. 4 is a flow diagram illustrating an example of a process for recovering a computer system by downloading a disk image, in accordance with one embodiment. The process may start when a client computer system (e.g., computer system 300) fails due to errors associated with the disk drive, as shown in block 405. When the client computer system fails, one or more alerts may be generated. The alert may be sent to an OOB controller in the client computer system. The OOB controller may execute a recovery agent to recover the client computer system, as shown in block 410. The recovery agent may include multiple instructions and may be stored in a firmware. The recovery agent may correct the disk drive by identifying and bypassing the bad disk sectors. At block 415, the OOB controller establishes a connection with a server computer system using a wireless communication device. This connection may require the OOB controller to perform some challenge response operations to authenticate the client computer system. At block 420, a disk image is downloaded from the server computer system. The disk image may correspond to the information on the disk drive. At block 425, the disk image is written to the disk drive. At block 430, the OOB controller may cause the client computer system to reset and the information on the disk drive may be used. Also illustrated in FIG. 4 is the alternative process used when the recovery agent is not in the firmware, shown by the dotted lines. The OOB controller may first need to establish a connection with the server computer system and to authenticate the client computer system with the server computer system, as shown in block 406. At block 407, the recovery agent is downloaded. At block 408, the recovery agent repairs the disk drive. The process then continues at block 420 which is described above.

Figure 5:
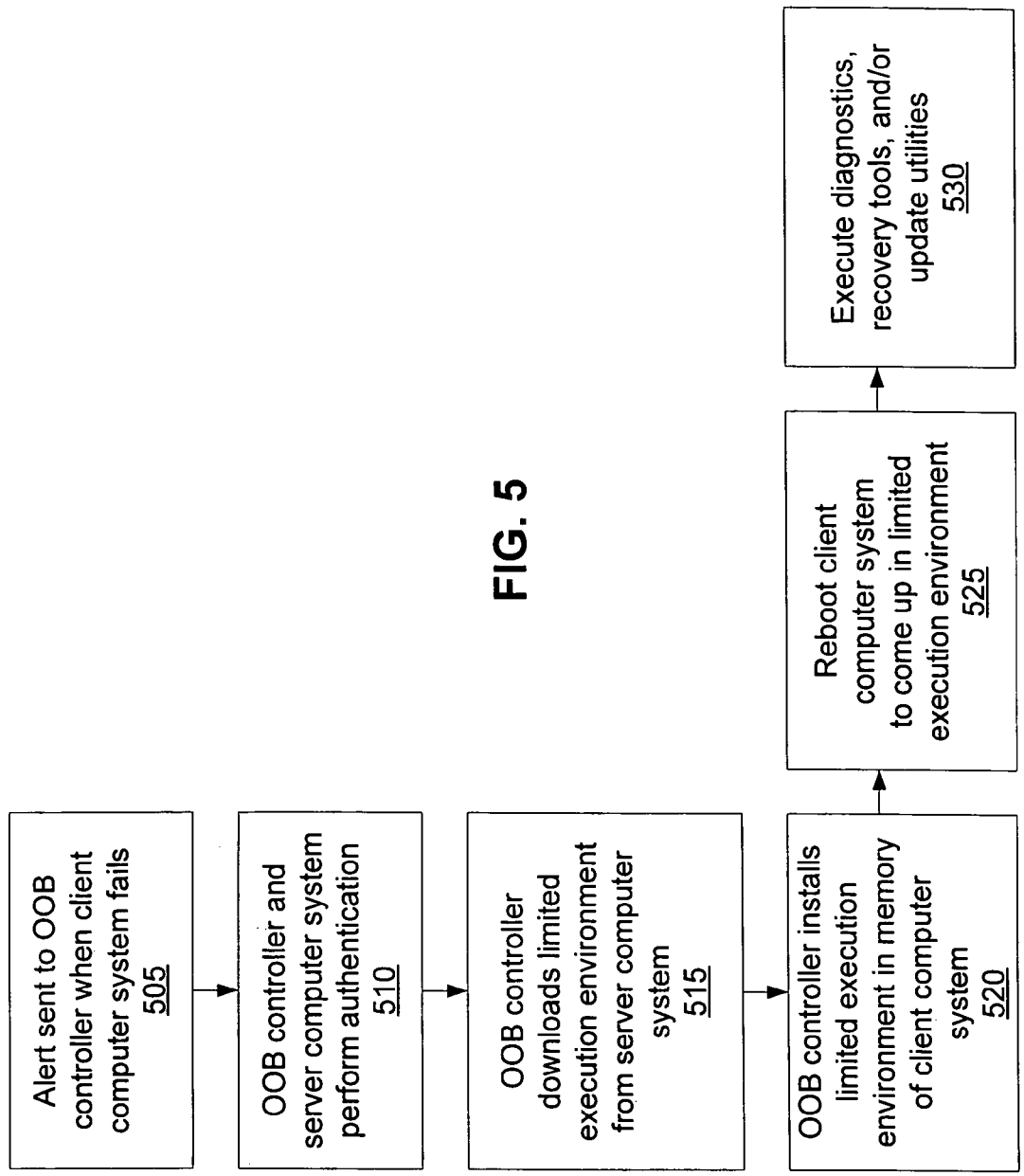
FIG. 5 is a flow diagram illustrating an example of a process for recovering a computer system by downloading a limited execution environment, in accordance with one embodiment.

FIG. 5 is a flow diagram illustrating an example of a process for recovering a computer system by downloading a limited execution environment, in accordance with one embodiment. The process may start at block 505 when one or more alerts may be generated. The alert may be sent to an OOB controller in the client computer system. At block 510, the OOB controller connects with the server computer system. The connection may include performing authentication operations to authenticate the client computer system. At block 515, information associated with a limited execution environment may be downloaded from the server computer system. The information may include a particular build of an OS, one or more memory resident applications, etc. The small execution environment may be installed in the memory, as shown in block 520. At block 525, the OOB controller causes the client computer system to reset and come up in the limited execution environment.

At block 530, the limited execution environment may load some additional recovery environment such as, for example, Windows PE (Pre-Install Edition) or some other limited functions environment for recovering the state of the client computer system. Such recovery may include, for example, re-imaging the disk drive 155, updating firmware (platform BIOS, OOB controller firmware, CPU microcode, NIC patch, disk firmware, etc), or running some suit of diagnostics software in order to identify any other errors. The firmware revisions and authorization for updates may require exchanging credential information as mentioned in FIG. 2B.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, the OOB controller 315 may also be used to connect to a server computer hosted by a software vendor. Once the computer system 300 is authenticated by the software vendor computer system, software upgrades may be pushed from the software vendor computer system to the computer system 300. As another example, the OOB controller 315 may be used to re-provision firmware (e.g., BIOS, microcode in the wireless MAC, etc.) in the computer system 300. Newer version of a firmware may be downloaded from a computer system hosted by a manufacturer after a challenge response process has been successfully completed.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A system, comprising:
   a processor;
   an out of band (OOB) controller coupled to the processor; and
   a wireless communication device coupled to the OOB controller, wherein the OOB controller is configured to receive data image over a network connection, the data image used to automatically update the system;
   wherein the data image includes an image of a limited execution environment, the limited execution environment including a limited function operating system (OS) and one or more memory resident applications.

2. The system of claim 1, wherein the network connection is established with a server computer system after the OOB controller exchanges credential information with the server computer system.

3. The system of claim 2, wherein updating the system includes recovering the system from a failure.

4. The system of claim 3, wherein the failure is associated with a disk drive coupled to the processor and to the OOB controller, and wherein the data image includes a disk image.

5. The system of claim 4, wherein the data image includes an operating system (OS) image.

6. The system of claim 5, wherein the data image is received in compressed form.

7. The system of claim 4, wherein the OOB controller is to cause the processor to reset after the data image is written to the disk drive.

8. The system of claim 1, wherein the OOB controller is to cause the processor to reset and to start in the limited execution environment.

9. The system of claim 8, wherein the processor is to execute instructions in the limited execution environment to update the system.

10. The system of claim 9, wherein the instructions are to recover the system from a disk failure associated with a disk drive coupled to the processor.

11. The system of claim 9, wherein the instructions are to update firmware in the system.

12. The system of claim 9, wherein the instructions are to update applications in the system.

13. A method, comprising:
    using an out of bound (OOB) controller to establish a connection with a second computer system via a wireless communication device, wherein the OOB controller and the wireless communication device are associated with a first computer system;
    receiving data image associated with a limited execution environment from the second computer system;
    causing the first computer system to reset and to come up in the limited execution environment; and
    updating the first computer system using the limited execution environment.

14. The method of claim 13, farther comprising:
    loading the limited execution environment in a memory associated with the first computer system; and
    exchanging credential information between the first computer system and the second computer system.

15. The method of claim 14, wherein the limited execution environment includes a limited function operating system (OS) and one or more memory resident applications.

16. The method of claim 15, wherein updating the first computer system includes recovering the first computer system from errors associated with a disk drive in the first computer system.

17. A computer readable storage medium containing executable instructions which, when executed in a processing system, causes the processing system to perform a method comprising:
    receiving a signal indicating one or more errors associating with a disk drive in a client computer system;
    downloading a disk image of the disk drive from a server computer system using OOB communication via a wireless communication device in the client computer system, the disk image including a limited execution environment;
    causing the client computer system to start in the limited execution environment;
    exchanging credential information between the client computer system and the server computer system before the disk image is downloaded; and
    correcting the one or more errors associated with the disk drive when the client computer system is in the limited execution environment.

18. The computer readable medium of claim 17, wherein correcting the one or more errors comprises:
    scanning the disk drive to identify bad sectors; and
    causing the bad sectors not to be used to store data.

19. The computer readable medium of claim 18, wherein the limited execution environment includes a limited function operating system (OS) and one or more memory resident applications.

* * * * *